Patented Dec. 7, 1926.

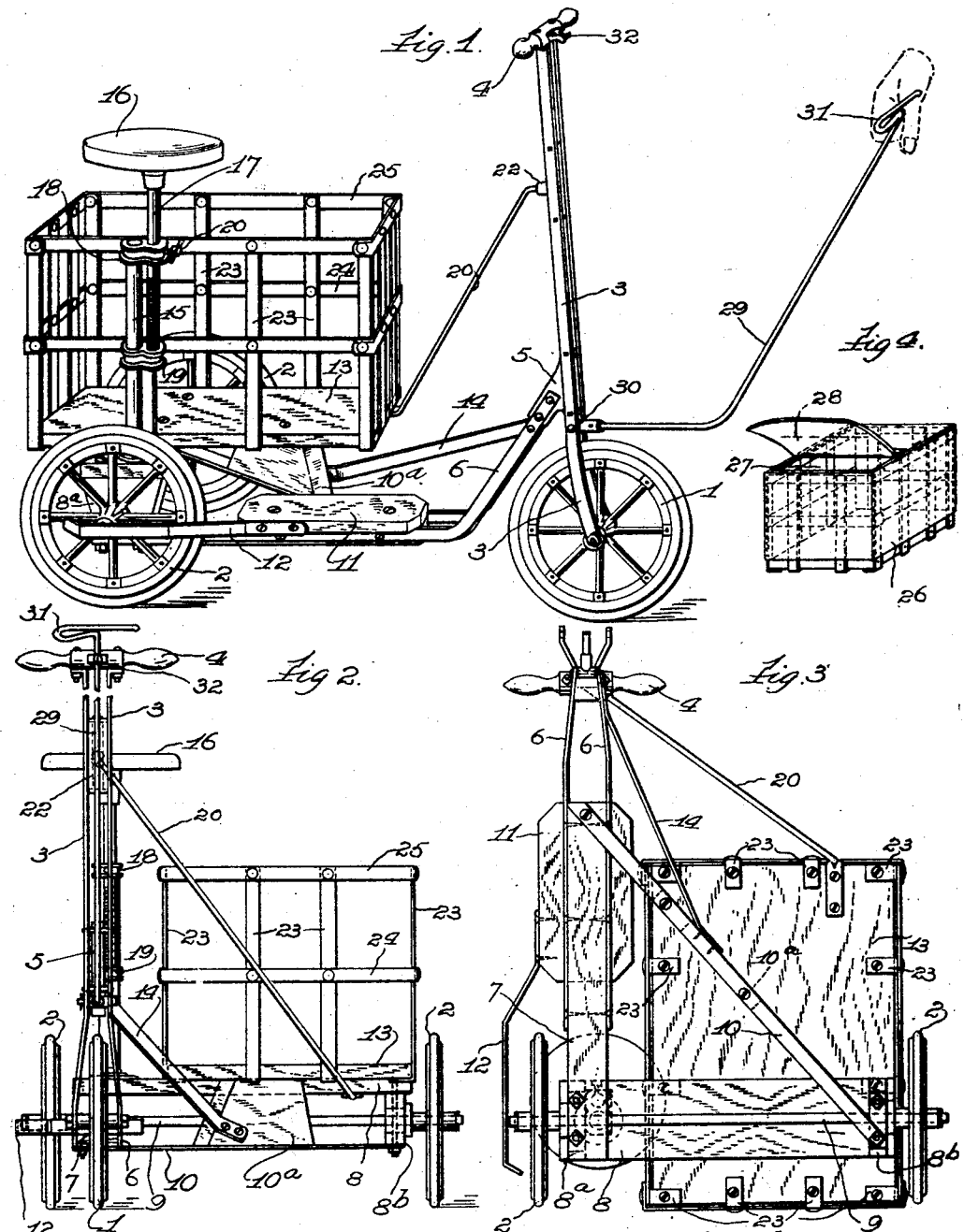

1,609,609

UNITED STATES PATENT OFFICE.

CONRAD DAHL, OF SPRINGFIELD, OHIO, ASSIGNOR TO ROBERT N. BURTON, OF CHICAGO, ILLINOIS.

COASTER VEHICLE.

Application filed February 27, 1926. Serial No. 91,114.

This invention relates to an improved form of coaster vehicle, and its object is to provide such a vehicle with a load-carrying body arranged in convenient relation to the position of the rider. It consists in certain features and elements of construction in combination as herein shown and described and as indicated by the claims.

In the drawings:

Figure 1 is a perspective side view of a vehicle embodying this invention.

Figure 2 is a front elevation of the same.

Figure 3 is a bottom plan view.

Figure 4 is a perspective view of the body with a flexible cover applied thereto.

This invention is developed from a familiar type of coaster vehicle which consists essentially of a pair of wheels arranged in tandem fashion with a foot board suspended between them so that the rider may stand on the foot board and propel himself by an occasional push with one foot upon the ground. The front wheel is usually attached pivotally so that with an upwardly extending handle it may be arranged for steering the vehicle over any desired course. In the present construction a front wheel, 1, and two rear wheels, 2, are employed and the front wheel is preferably not arranged in strictly tandem relation to either of the rear wheels, but is approximately in line with one of them, as indicated in Figure 2. The front wheel, 1, is carried in a forked member, 3, extending upwardly and provided with a steering handle, 4. At a point slightly above the wheel, 1, the fork, 3, is attached by vertical pivotal means to a head member, 5, from which there depends rearwardly and obliquely downward a pair of frame members, 6, which are spaced apart and secured to opposite sides of a wooden bar, 7. The latter is bolted at its rear end to a wooden bolster block, 8ª, at one end of the bolster, 8. The rear axle, 9, is secured in the block, 8ª, and a similar block, 8ᵇ, at the other end of the bolster. The right angular relation between the parts, 7 and 8, is maintained by a diagonal brace, 10. A foot board, 11, is mounted directly on top of the bar, 7, just rearward of the inclined portion of the member, 6, and a guard rail, 12, may be attached to the outer edge of the foot board, 11, to extend rearwardly past the hub of the wheel, 2, to prevent the rider's clothing from catching or tearing on the end of the axle, 9.

The body shown for the purposes of illustration includes a floor, 13, which is mounted somewhat higher than the level of the foot board, 11, being secured directly to the bolster, 8, which is carried at the proper elevation by the height of the blocks, 8ª and 8ᵇ. An additional block, 10ª, is preferably interposed between the diagonal strap, 10, and the floor, 13, and the side of this block, 10ª, provides a convenient surface for securement of a diagonal brace, 14, extending upwardly for attachment to the metal frame adjacent the head casting, 5. The body floor, 13, occupies the width of the vehicle between one wheel, 2, and the inner edge of the foot board, 11. Directly in the rear of the foot board, 11, a post, 15, is mounted on the bolster, 8, to support a seat, 16, which may be in the form of a circular stool having the stem, 17, carried in brackets, 18 and 19, on the post, 15. The lower bracket, 19, is threaded to receive the threaded end portion of the stem, 17, for vertical adjustment of the stool and a clamping set screw, 20, may be provided in the upper bracket, 18, to secure the stool at adjusted position. From the forward edge of the body floor, 13, a rod, 21, extends diagonally upward to a terminal fitting, 22, which like the head casting, 5, is connected to the steering fork, 3, by pivotal means axially aligned with the pivotal connection at the head, 5. This member, 20, greatly strengthens and steadies the upper end of the steering fork, 3, and relieves the casting, 5, of a part of the strain.

It may be understood that the body may be of any type suited to the intended use of the vehicle and for purposes of illustration I have shown a special body design for carrying newspapers and composed of strap metal secured to the platform, 13, in the form of upright staves, 23, and horizontal bands, 24 and 25, the former being secured to the members, 23, at about half their height and the latter being attached to their upper ends to form the upper edge of the body. The newspapers may be packed into this cage-like body standing on edge on the platform, 13, and in wet weather a stitched canvas cover such as that shown in Fig. 4 at 26 may be slipped over the cage to keep the papers dry. At one end of the body the cover may have a transverse slot, 27, in its top wall with a flexible flap, 28, which may be raised for access to the interior of the cage.

A vehicle of this type is readily propelled along a sidewalk by the rider either standing with one foot on the foot-board, 11, or seated upon the stool, 16, and using his other foot for pushing against the sidewalk at intervals. With relatively small wheels, however, it is difficult to operate such a vehicle over curves and other bumps, and for this purpose I provide a tongue, 29, hinged in the fork, 3, at 30, and formed with a bent handle portion, 31, at its outer end. Except when this tongue is in use for pulling the vehicle, it may be swung up into engagement with a spring retainer, 32, and will in no wise interfere with the normal steering of the vehicle.

I claim:—

1. In a coaster vehicle having a front steering wheel and a pair of rear wheels, an axle connecting the rear wheels, a load-carrying body over said axle, a seat substantially over the axle at one side of said body, the said front wheel being directly ahead of the seat, a steering handle associated with the front wheel and a footboard at one side of the body between the seat and the front wheel.

2. In a coaster vehicle having a pair of rear wheels with an axle connecting them, a load-carrying body over said axle, a seat substantially over the axle at one side of said body, a front steering wheel, a steering handle located directly ahead of the seat and a footboard at one side of the body between the seat and said steering handle.

3. In a coaster vehicle having a front steering wheel and steering handle and a pair of rear wheels, an axle connecting the rear wheels, a load carrying body over said axle, a seat substantially over the axle at one side of said body, said front wheel being directly ahead of the seat, a drop frame supporting a footboard at one side of the body and extending rearwardly from the front wheel to the rear axle, and a diagonal brace extending from the forward portion of said frame to the axle at the other side of the body.

4. In a coaster vehicle having a pair of rear wheels with an axle connecting them, a load-carrying body over said axle, a seat at one side of the body, a footboard extending forwardly from the seat, a steering wheel positioned directly ahead of the seat and footboard, a forked member extending rigidly upward from said wheel with a steering handle thereon and a draft tongue attached to the fork by a horizontal pivotal connection adapted to swing in a vertical plane and retaining means for disengageably holding said auxiliary handle in upright position adjacent the forked member.

5. In a coaster vehicle having a pair of rear wheels with an axle connecting them, a load-carrying body over said axle, a seat substantially over the axle at one side of said body, a front steering wheel, a frame extending forwardly from said seat, a steering member extending upwardly from the steering wheel and pivotally connected to said frame adjacent the wheel, together with a brace extending obliquely upward from the side of the body away from the seat and connected to said steering member by pivotal means in axial alignment with the pivot connection of the frame.

6. In a coaster vehicle having a pair of rear wheels with an axle connecting them, a load-carrying body over said axle, a seat substantially over the axle at one side of the body with a footboard extending forwardly from the seat and a steering wheel directly ahead of the seat and footboard, a steering member extending upwardly from said wheel, means supporting the forward end of the footboard by pivotal connection with said steering member and a diagonal brace member secured adjacent the axle at the side of the body opposite the seat extending forwardly under the body and secured adjacent the forward end of the footboard, said brace intermediate its ends contributing support to the body.

7. In a coaster vehicle having a pair of rear wheels with an axle connecting them, a load-carrying body over said axle, a seat substantially over the axle at one side of said body with a footboard extending forwardly from the seat and a steering wheel directly ahead of the seat and footboard, an adjustable mounting for the seat comprising a vertical post over the axle with upper and lower brackets, the seat having a stem with a threaded lower portion, the lower bracket being threaded to receive said stem and the upper bracket comprising a guide for the upper unthreaded portion thereof together with a clamping screw in the upper bracket for engaging the same to hold it at adjusted position.

8. In a coaster vehicle comprising a pair of rear wheels with an axle connecting them, a footboard extending forwardly from the axle adjacent one of the wheels, and a front steering wheel supporting the forward end of the footboard, a guard member secured to the outer edge of the footboard and bent outwardly therefrom extending past the outer end of the rear axle.

9. In the combination defined in claim 8, the rear end of said guard being bent inwardly toward the plane of the wheel.

10. In a load-carrying vehicle, a body comprising a platform and corner posts with vertically extending members between said posts and a cover of flexible material in box-like form downwardly open adapted to fit down over the corner posts, said cover having a slit adjacent one upper edge and a flexible flap to cover said slit.

CONRAD DAHL.